United States Patent
Drewe et al.

(10) Patent No.: US 6,994,199 B2
(45) Date of Patent: Feb. 7, 2006

(54) LOAD TORQUE BLOCKING DEVICE

(75) Inventors: Ingo Drewe, Buehl (DE); Guido Schneider, Witten (DE)

(73) Assignee: Robert Bosch GmbH, (DE)

( * ) Notice: Subject to any disclaimer, the term of this patent is extended or adjusted under 35 U.S.C. 154(b) by 0 days.

(21) Appl. No.: 10/477,091

(22) PCT Filed: Sep. 20, 2002

(86) PCT No.: PCT/DE02/03544

§ 371 (c)(1),
(2), (4) Date: Nov. 6, 2003

(87) PCT Pub. No.: WO03/054409

PCT Pub. Date: Jul. 3, 2003

(65) Prior Publication Data

US 2004/0144615 A1    Jul. 29, 2004

(30) Foreign Application Priority Data

Dec. 11, 2001  (DE)  ................................. 101 60 684

(51) Int. Cl.
*F16D 41/10*  (2006.01)
*F16D 59/00*  (2006.01)

(52) U.S. Cl. ........................ 192/223; 192/144; 318/372
(58) Field of Classification Search ................ 192/223, 192/223.2, 15, 16, 144, 45.2, 73; 188/134, 188/82.1, 76; 318/362, 372
See application file for complete search history.

(56) References Cited

U.S. PATENT DOCUMENTS

| | | | | |
|---|---|---|---|---|
| 1,170,085 A | * | 2/1916 | Maurseth | 192/45.2 |
| 2,074,585 A | * | 3/1937 | Grisdale | 192/45.2 |
| 2,444,592 A | | 7/1948 | Creson | |
| 3,335,831 A | * | 8/1967 | Kalns | 192/223 |
| 3,587,796 A | * | 6/1971 | Nestvogel | 192/223 |
| 4,877,113 A | * | 10/1989 | Taig | 192/223.2 |
| 6,655,520 B2 | * | 12/2003 | Schuster | 192/223 |

FOREIGN PATENT DOCUMENTS

| | | |
|---|---|---|
| DE | 30 30 767 | 2/1982 |
| DE | 89 10 857.4 | 1/1991 |
| DE | 197 53 106 A | 2/1999 |
| EP | 1 122 390 A | 8/2001 |
| JP | 06 313448 A | 3/1995 |

* cited by examiner

*Primary Examiner*—Rodney H. Bonck
(74) *Attorney, Agent, or Firm*—Michael Best & Friedrich LLP

(57) ABSTRACT

The invention concerns a load torque lock for automatically locking load-side torques in the case of a decrease or cessation of a drive-side torque having a housing (11) fixed to a frame, a locking ring (17) permanently connected to it and a locking body (17) cooperating with it and revolving on the drive side, with locking devices which, on the one hand, clamp on the locking ring (17) with the occurrence of a load torque by swiveling the locking body (17) by means of locking elements (27, 28) of the output shaft (15) and, on the other hand, release from the locking ring (17) by swiveling the locking body (17) back by means of driving elements (23, 24) of the drive shaft (14). To avoid undesired friction or defective jamming of the locking devices on the locking ring (18) by the centrifugal forces of the locking body (17) it is embodied in such a way that its mass center of gravity (M) lies in the area of the rotational axis of the drive shaft and the output shaft that are aligned with one another.

21 Claims, 2 Drawing Sheets

LOAD TORQUE BLOCKING DEVICE

BACKGROUND OF THE INVENTION

The invention concerns a load torque lock for automatically locking load-side torques.

Load torque locks belong to the species of automatically locking locks and are used in terms of their functioning with self-switching free-wheel mechanisms. They are installed as locking elements in a drive train and automatically block the torques initiated by the output mechanism in one or both directions of rotation when the driving mechanism is at an standstill, while the torques initiated by the drive side are transmitted in the one or the other direction of rotation. As a result, torques acting on the load side in a drive train can be supported and locked with the aid of the load torque lock against a stationary frame or housing. It forms a safety element, which prevents impermissible movement of the load side from outside forces or torques in the case of a decrease or cessation of the driving mechanism. Such load torque locks are suited especially for use in drive trains with alternating directions of rotation. Using them permits braking systems or self-locking transmissions that would otherwise be required to be dispensed with.

Different types of physical effects are already currently being utilized for load torque locks. Thus, in accordance with DE 30 30 767 C2, a coil spring lock is used for manually driven lifting apparatuses, which utilize a frictionally engaged catch band effect. Moreover, the utilization of a frictional clamping effect is known in accordance with G 89 10 857, according to which clamping rollers cooperate with a profiled output shaft.

These systems are based on frictionally engaged principles of action and require a certain pretension of the clamping or locking elements for continual locking readiness in order to cooperate quickly and reliably with components fixed to a frame with the occurrence of load torques. As a result of this pretension of the clamping or locking elements, which is not completely suspended even in the case of a drive-side drive-through, they remain in continual frictional contact with the components fixed to a frame. However, this results in high frictional losses and poor efficiency, which leads to greater warming when high rpms are to be transmitted. The range of application of the load torque locks functioning according to the known frictionally engaged principles of action is therefore restricted to driving mechanisms with low rpms.

Another design of the load torque locks is known from DE 197 53 106 C2, which is based on the tilting and swiveling effect. The clamping or locking bodies used there are carried along by rotating the drive shaft with driving elements on an orbit, which has a relatively large radial distance to the axis of rotation of the load torque lock. Because of this off-center arrangement of the clamping or locking bodies, centrifugal forces develop in the case of a drive-side drive-though, which can for their part cause undesired tilting of the clamping or locking bodies. In fact the patent specification mentions in reference to FIG. 9 that in order to avoid frictional contact of the clamping or locking bodies with the clamping or locking ring unit that is fixed to a frame from developing centrifugal forces, these centrifugal forces can be supported by a certain embodiment via the add-on parts of the output shaft. However, this is only the case at a certain operating point dependent upon the driving mechanism's rpms and the torque.

The attainment at hand attempts to embody a load torque lock in such a way that an impermissible response of the load torque lock to centrifugal forces is reliably avoided over the entire rpm range.

SUMMARY OF THE INVENTION

The load torque lock, in accordance with the invention, has the advantage that the occurrence of centrifugal forces on the clamping bodies is avoided for the most part by displacing the mass center of gravity of the clamping bodies to the area of the axis of rotation, which in turn results in reliable avoidance over the entire rpm range of centrifugal-force-induced swiveling of the locking bodies and locking of the drive load that is thereby triggered. This results in a further advantage that this type of load torque lock can also be used preferably for high speed driving mechanisms such as electric motors that drive adjusters or components that move back and forth.

Advantageous further developments and improvements exist.

Thus, the locking body is designed in a simple-to-manufacture and space-saving manner as a locking disk, which is arranged perpendicular to the axis of rotation in the housing and is preferably embodied to be circular or annular.

A quick and effective clamping or releasing of the locking disk on the locking ring fixed to the housing is achieved by slightly swiveling the locking disk so that the locking disk features at least two locking means on different radii and offset from one another around an angle in the circumferential direction, of which the one locking means cooperates with the outside of at least one locking ring fixed to the housing and the other locking means cooperates with its inside.

In order to counteract any inclination of the locking disk when the load torque lock is responding and to avoid an initial axial springiness of the locking disk, it is proposed that on both front sides of the locking disk two aligned locking means are each arranged laterally reversed, each of which cooperate with one of two locking rings arranged fixed to the housing on both sides of the locking disk. The locking means in this connection are embodied in a simple and reliable manner as clamping bolts projecting from the front side of the locking disk on both sides parallel to the axis of rotation.

In order to achieve a reliable clamping of the clamping bolts on the locking rings, they are embodied in a structurally rugged and simple-to-manufacture manner as a locking ring wall projecting from each front side of the housing towards the inside until in front of the locking disk and concentric to the axis of rotation, on whose outside and inside circumferential surfaces a clamping bolt of the locking disk is each able to engage. Locking means known in the state of the art can also be used as an alternative to the clamping bolts, whereby then the outside and inside circumferential surfaces of the locking ring wall must feature a corresponding locking gear design. Alternatively, in the case of load torque locks whose possible load torques are relatively small, a locking ring wall arranged on both sides of the locking disk can be dispensed with by arranging it only on the front side of the locking disk. This allows the axial width of the housing to be reduced.

For the lowest possible swiveling of the locking disk in order to achieve a quick response and release of the load torque lock, the locking means are expediently arranged in a radial external area of the locking disk, whereby the driving elements and the locking elements of the drive shaft and the output shaft engage on its radial interior area to swivel the locking disk.

It is important for the arrangement of the driving and locking elements that these cooperate as effectively as possible with the locking disk in order to swivel the locking disk for locking and releasing the load torque lock when turning the drive shaft or the output shaft. For this purpose, a first plane is mentally stretched over the axis of rotation, which runs through the locking means (clamping bolts) and, related to this first plane, the at least one driving element is arranged on the one side and the at least one locking element is arranged on the other side of this plane, whereby these elements engage at the locking disk in such a way that they swivel the locking disk to release or lock the locking means (clamping bolts) perpendicular to this first plane in the one direction or the other opposing direction.

In order to permit a load torque lock to become effective for both directions of rotation, one driving element and one locking element are each provided for each direction of rotation, which engage on the locking disk. Since to lock or release the load torque lock, the locking disk may be swiveled independently of the direction of rotation of the drive shaft and the output shaft only in the one direction or only in the other opposing direction, the driving and locking elements must consequently be arranged for each direction of rotation. For this purpose, a second plane is stretched over the axis of rotation, which runs perpendicular to the first plane and, related to the this second plane, a driving element and a locking element are each arranged to engage on the one side and a driving element and a locking element are each arranged to engage on the other side of this second plane at the locking disk.

In order to guarantee the most defined contact points possible between the driving elements or the locking elements and the locking disk, the driving elements are embodied in a simple and rugged manner as driving bolts projecting from a flange-like end of the drive shaft parallel to the axis of rotation, each of which engages in a larger recess of the locking disk. In addition, the locking elements are embodied in a corresponding manner as locking bolts projecting from a flange-like end of the output shaft parallel to the axis of rotation, each of which engages preferably together with a spring element in a larger recess of the locking disk.

It is particularly expedient with respect to the lines of application of the force originating from the driving and locking elements to swivel the locking disk if, when the locking disk is in a position of rest, at least one driving element forms a contact point with the locking disk on its side facing the first plane and if, moreover, the at least one locking element features a small distance to a contact point with the locking disk on its side facing the first plane. In this connection, the previously mentioned distance is bridged in an advantageous manner by the spring element, which is arranged on the locking bolts serving as the locking element.

For a compact and rugged embodiment of the load torque lock, it is further proposed that the flange-like ends of the drive shaft and the output shaft be positioned on the opposing front sides of the housing. In this connection, the locking disk is arranged in a structurally simple and safe manner between the spaced-apart, flange-like ends of the drive shaft and output shaft. Since, due to the position of the contact points of the driving and locking elements with the corresponding recesses of the locking disk, the forces that become effective when locking or opening the load torque lock for slight swiveling of the locking disk run almost perpendicular to the first plane, an opened lock in normal operation simultaneously achieves that no significant frictional force occurs between the locking ring fixed with the housing and the locking means (clamping bolts) so that it is possible to dispense with additional measures for contact free revolution on the locking ring.

For the most stable possible positioning of the drive shaft and output shaft it is further proposed that the locking disk be provided with a centric opening, through which a bearing neck of the output shaft projects, which is accommodated in a bearing inserted in a front-side bearing bore hole of the drive shaft. Alternatively, this can also takes place in a reverse manner via a bearing neck of the drive shaft positioned on the output shaft.

In order to compensate for any imbalance caused by the locking means of the locking disk, it is expediently proposed to arrange a material accumulation on the circumferential area of the locking disk that is diametrically opposed to the locking means in such a way that the mass center of gravity of the locking disk lies as precisely as possible on the axis of rotation. As an alternative to this material accumulation, it is also possible to carry out a material reduction for the same purpose in the area of the locking means (clamping means), e.g., by bore holes in the locking disk arranged in the circumferential direction on both sides next to the locking means (clamping bolts).

A compact load torque lock can be achieved in an advantageous manner by the housing being embodied cylindrically inside, whereby a ring air gap sufficient for the swivel movement of the locking disk to release or lock the locking means (clamping bolts) lies between the locking disk and the inside wall of the housing. In the case of this embodiment, the locking means of the locking disk engaging on the inside circumference of the locking ring can also be arranged alternatively on the outside circumference of the locking disk and engage there by swiveling the locking disk on the inside wall of the housing.

Instead of driving and locking bolts fastened on the flange-like ends of the drive shaft and output shaft and engaging in the recesses of the locking disk, they can be fastened alternatively in an reverse manner also on the locking disk and engage in corresponding recesses of the flange-like ends of the drive shaft and the output shaft.

For a particularly advantageous use of the load torque lock, it is proposed that it be combined with an electric motor into a drive unit, in which the output shaft of the electric motor simultaneously forms the drive shaft of the load torque lock. In addition, the load torque lock can also be used in a preferred manner in cases where till now self-locking transmission with an efficiency of <50% are being used. For this purpose it is proposed that the load torque lock be used between the output shaft of an electric motor and the drive shaft of a non-self-locking transmission unit. Such a system has the advantage that the overall degree of efficiency of the system is clearly increased above 50% by the use of an easy-running transmission. In addition, the functional and/or manufacturing-related swing angle clearances connected with a load torque lock are transmitted to the transmission output only to a degree that corresponds to the transmission ratio. In addition, rotational movements initiated on the drive side in both directions of rotation are blocked while maintaining the drive-side possibility of power transmission. Due to the improved efficiency of such a system, an electric motor with a smaller structural shape and the same drive power can consequently be used with the advantages of cost savings, smaller construction space, a lower mass and inertia of masses, better dynamic behavior, lower consumption of energy and better installation conditions.

BRIEF DESCRIPTION OF THE DRAWINGS

Additional details of the invention are explained in more detail in the exemplary embodiment described in the following on the basis of the associated drawings. The drawings show.

DETAILED DESCRIPTION

Figure 2:
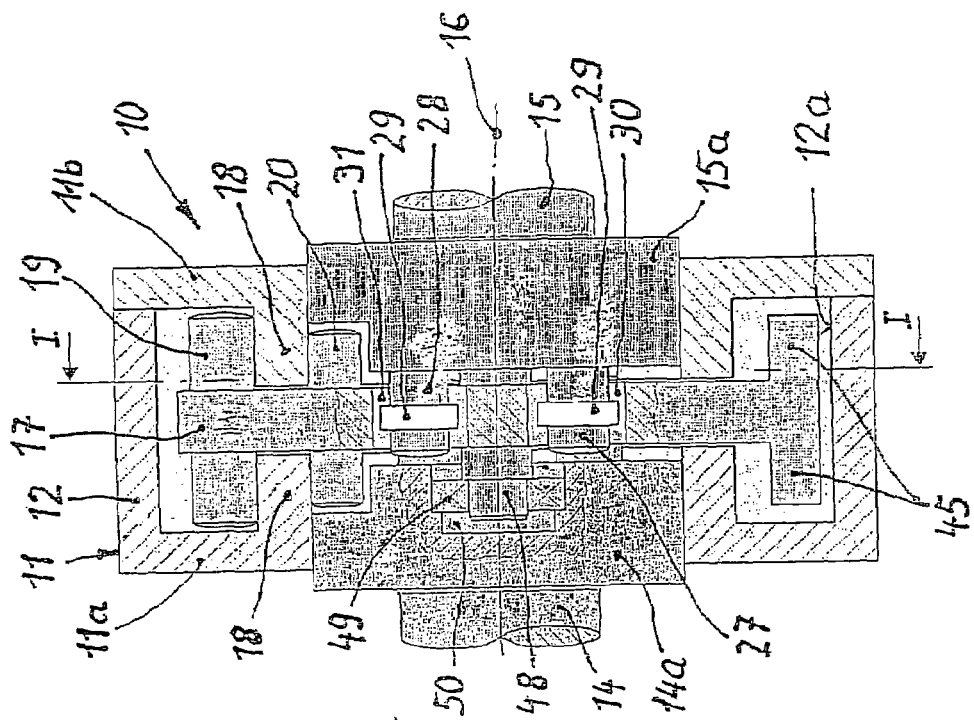
FIG. 2 shows the same load torque lock in a longitudinal section of the housing.
Figure 1:
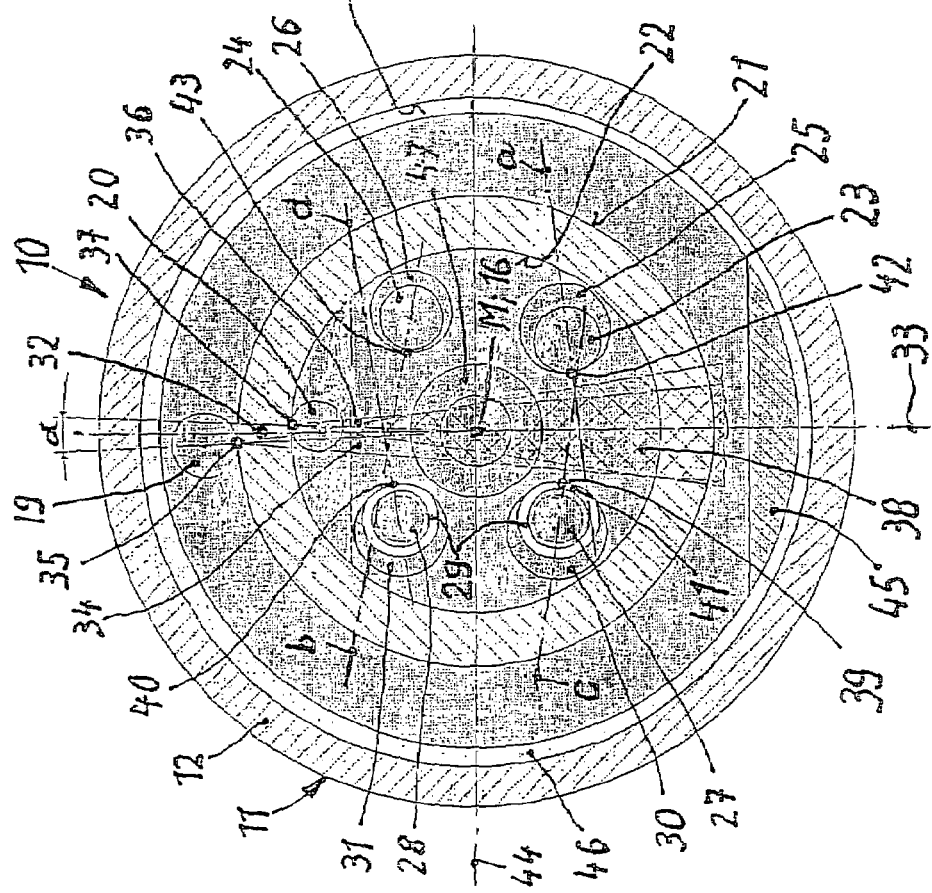
FIG. 1 shows a cross-section of a load torque lock in accordance with the invention according to Line I—I from FIG. 2.

FIGS. 1 and 2 show a cross-section or longitudinal section of load torque lock 10 in accordance with the invention. It has a stationary housing 11 fixed to a frame with an external cylindrically embodied housing wall 12 and flange-like front sides 11a and 11b, on which a drive shaft 14 with a flange-like end 14a is pivoted on the one side 11a and an output shaft 15 with a flange-like end 15a is pivoted on the other side 11b. The drive shaft and output shaft 14, 15 lie on a common axis of rotation 16. Arranged between their spaced-apart, flange-like ends 14a, 15a is a locking body in the form of a locking disk 17 in a housing 11, which cooperates via locking means with locking rings fixed with the housing. The locking rings are embodied in the exemplary embodiment as a locking ring walls 18 projecting from the two front sides 11a, 11b of the housing 11 towards the inside until in front of the locking disk 17 and concentric to the axis of rotation 16. Serving as locking elements are two clamping bolts 19 and 20 that are solidly inserted in the locking disk 17 parallel to the axis of rotation 16, which project from the locking disk 17 laterally reversed on both sides. Thus, on both sides of the locking disk 17, the clamping bolts 19 and 20 each form two aligned locking means, which each cooperate with one of the locking ring walls 18 fixed to the housing on both sides of the locking disk 17. The two clamping bolts 19 and 20 are arranged on radii of varying sizes in the external circumferential area of the locking disk 17, whereby the clamping bolt 19 cooperates with the larger radius to the axis of rotation 16 with the outside 21 and the clamping bolt 20 cooperates with the smaller radius to the axis of rotation 16 with the inside 22 of the two locking ring walls 18. In order to be able to clamp or release the clamping bolts 19 and 20 to the locking ring walls 18 by a slight swiveling on both sides transverse to the axis of rotation 16, the two clamping bolts 19 and 20 are offset from one another in the circumferential direction by an angle α, which is approx. 5° in the case of the example given. The outside and inside 21, 22 of the locking ring walls 18 thus form working surfaces for the clamping bolts 19 and 20 to fix the locking disk 17.

While the clamping bolts 19 and 20 are arranged in a radial external area of the locking disk 17, driving and locking elements of the drive shaft and the output shaft 14, 15 engage in a radial interior area to swivel the locking disk 17. In this connection, the driving elements are formed by driving bolts 23, 24 projecting from the flange-like end 14a of the drive shaft 14 parallel to the axis of rotation 16, each of which engages in a larger recess 25, 26 in the form of a bore hole of the locking disk 17. The locking elements in this case are formed by two locking bolts 27, 28 projecting from the flange-like end 15a of the output shaft 15 parallel to the axis of rotation 16, which each engage with a fitted spring element in the form of a ring 29 made of elastic material in a larger recess 30, 31 in the form of a bore hole of the locking disk 17. By rotating the drive shaft or output shaft 14, 15 in the one or the other direction of rotation, the locking disk 17 can be swiveled somewhat to one or the other side by a driving bolt 23, 24 or locking bolt 27, 28 around a non-fixed, anisotrophic swiveling axis 32 running between the two clamping bolts 19, 20.

In the exemplary embodiment according to FIG. 1, the locking disk must be swiveled somewhat to the right to clamp the clamping bolts 19 and 20 on the locking ring walls 18, while it must be swiveled somewhat to the left to release the clamping bolts 19, 20 from the locking ring walls 18. In order to guarantee that this happens, the driving bolts and locking bolts 23, 24 and 27, 28 must correspondingly engage on the locking disk 17. For this purpose, a first plane 33 is stretched over the axis of rotation 16 running though the clamping bolts 19, 20. Related to this plane 33, the driving bolts 23, 24 of the drive shaft 14 are now arranged on the right and the locking bolts 27, 28 of the output shaft 15 are arranged on the other, left side of this plane 33 engaging at the locking disk 17. In addition, a physical mathematical requirement for clamping or releasing the locking disk is that to achieve a position of equilibrium via the so-called tilting, an outside force on the tilted body must run through the sectional area of the angle of friction on the contact locations. The angles of friction running downward and occurring on the contact points between the clamping bolts 19, 20 and the locking ring walls 18 are depicted in FIG. 1. A first angle of friction 34 runs from contact point 35 of the upper clamping bolt 19 with the outside of the locking ring wall 18 radially inward and a second angle of friction 36 runs from the contact point 37 of the inner clamping bolt 20 with the inside 22 of the locking ring wall 18 radially inward. The two angles of friction 34 and 36 are shown opposed and shaded. They form a sectional area 38 with crosshatching, through which the aforementioned first plane 33 runs. The driving bolts and locking bolts 23, 24 and 27, 28 are now arranged in such a way in the recesses 25, 26 and 30, 31 of the locking disk 17 that, when the locking disk 17 is in a position of rest in accordance with FIG. 1, the driving bolts 23, 24 of the drive shaft 14 each form a contact point 42, 43 with the locking disk 17 on their sides facing the first plane 33, on the one hand. On the other hand, the locking bolts 27, 28 each have a small distance 41 to a contact point 39, 40 with the locking disk 17 on their side facing the first plane 33, whereby the elastic ring 29 bridges this distance 41 as a spring element of the locking bolts 27, 28. Because of this arrangement, the driving bolts and locking bolts 23, 24 and 27, 28 engage on the locking disk 17 in such a way that it can swivel somewhat in the one or the other opposing direction to release or lock the clamping bolts 19, 20 perpendicular to the first plane 33.

Moreover, the arrangement of the driving bolts and the locking bolts 23, 24 and 27, 28 shall be selected in such a way that both a drive-through of the drive shaft 14 as well as a triggering of the torque lock 10 is possible in both directions of rotation by rotating the output shaft 15 when there is a lacking driving mechanism. For this purpose, a driving bolt 23, 24 and a locking bolt 27, 28 for each of the two directions of rotation each engage at the locking disk 17. For a corresponding arrangement of the driving bolts and locking bolts, a second plane 44 is now stretched over the axis of rotation 16 perpendicular to the first plane 33. Related to this second plane 44, a driving bolt and a locking bolt 23 and 27 are each arranged on lower side and a driving bolt and locking bolt 24 and 28 are each arranged on the upper side of this second plane 44 in order to engage there with the locking disk 17.

A feature of the load torque lock 10 that is essential for the invention is the embodiment of the locking disk 17 in such a way that its mass center of gravity M lies in the area of the axis of rotation 16 of the aligned drive shaft and output shaft 14, 15. Since the arrangement of the clamping bolts 19 and 20 in the outer circumferential area of the locking disk 17 would now cause an imbalance, a kidney-shaped material accumulation 45 is arranged on the circumferential area of the locking disk 17 that is diametrically opposed to the clamping bolts 19, 20 on both sides of the locking disk 17 in such a way that the mass center of gravity M of the locking disk 17 lies as precisely as possible on the axis of rotation 16. In addition, the locking disk 17 is arranged inside the housing 11 in such a way that a ring air gap 46 sufficient for the swivel movement of the locking disk 17 to release or lock the clamping bolts 19, 20 lies between it and the inside wall 12a of the outer housing wall 12. Moreover, the locking disk 17 is provided with a centric bore hole 47 though which a bearing neck 48 on the flange-like end 15a of the output shaft 15 projects. The bearing neck 48 is accommodated in a bearing 49, which is inserted in a front-side bearing bore hole 50 of the drive shaft 14.

The operation of the load torque lock 10 in accordance with FIGS. 1 and 2 is such that, in the position of rest depicted, the locking disk 17 is accepted by the driving bolts and locking bolts 23, 24 and 27, 28 between the drive shaft and output shaft 14, 15, whereby clamping bolts 19, 20 are pressed by the elastic rings 29 of the locking bolts 27, 28 with low force against the locking ring walls 18. The load torque lock is therefore pre-tensioned in a defined manner.

If the shaft 14 is now driven by a driving mechanism (not shown) in the one or the other direction of rotation, then the driving bolts 23 and 24 are also consequently rotated to the right or left. In order to transmit this rotation also to the output shaft 15 via the locking disk 17, the locking disk 17 must rotate along. This takes place as follows with respect to FIG. 1.

In the case of a right-hand rotation, a force in the direction of line of application A occurs at contact point 42 of the driving bolt 23 with the locking disk 17. This force runs through the sectional area 38 of the two angles of friction 34, 36 originating from the clamping bolts 19, 20 with the consequence that, as a result, the locking disk 17 swivels around the assumed swiveling axis 32 so far and thereby compresses the elastic ring 29 until this force is absorbed by it at contact point 39 of the locking disk 17 with the locking bolt 27. As a result, the contacts of the two clamping bolts 19, 20 at the locking ring walls 18 are practically lifted and the locking ring 17 rotates frictionlessly with the drive shaft 15. Since the locking disk 17 also carries along the locking bolt 27 via the contact point 39, the output shaft 15 also rotates along accordingly, whereby, on the one hand, the upper locking bolt 28 with the ring 29 prevents the locking disk 17 from another lateral swivel and, on the other hand, a practically frictionless drive-through takes place. Since no centrifugal forces occur in the area of the rotational axis 16 even with high rpms on the locking disk 17 due to its center of gravity M the drive-through is also kept stable over the entire rpm range.

On the other hand, in the case of a left-rotating driving mechanism, a force engages in the contact point 43 of the driving bolt 24 with the locking disk 17, which cuts the sectional area 38 of the two angles of friction 34, 36 in the line of application B starting from contact point 43. The consequence of this is that with a left-hand rotation, the locking disk 17 swivels from the driving bolt 24 around the swiveling axis 32 so far to the left until this force is absorbed by it at contact point 40 of the locking disk 17 with the locking bolt 28 after the compression of the elastic ring 29. In this case as well, the friction between the clamping bolts 19, 20 and the locking ring walls 18 is lifted so that the locking disk 17 can now also rotate along in the other direction of rotation. The rotating locking disk 17 carries along the locking bolt 28 in this process so that the output shaft 15 is also thereby rotated along. Again in this case a transmission of torques thus takes place in drive-through from the drive shaft 14 via the locking disk 17 to the output shaft 15, whereby the clamping bolts 19, 20 also rotate along practically frictionlessly on the locking ring walls 18. In this case as well, another lateral swivel of the locking disk 17 is prevented because it is supported on the lower locking bolt 27 at the contact point 39 with the elastic ring 29.

In the case of a decrease or cessation of the load-side torque by switching off or shutting down the driving mechanism (not shown), the load torque lock is supposed to reliably prevent a rotation of the drive shaft by a load coupled. This takes place by swiveling the locking disk 17 to the right as follows:

In the case of the occurrence of a left-rotating (with respect to FIG. 1) load torque on the output shaft 15, when the spring element 29 is compressed in the contact point 39 of the lower locking bolt 27 with the locking disk 17, a force occurs in the line of application C running through this contact point 39, which goes through the sectional area 38 of the two angles of friction 34, 36. With this force the locking disk 17 is now swiveled somewhat to the right around its swiveling axis 32, whereby the two clamping bolts 19, 20 automatically clamp at their contact points 35, 37 with the locking ring walls 18 via a so-called tilting effect. The locking disk 17 is thereby fixed so that transmission of the torque to the drive shaft 14 cannot occur.

In the case of a load torque occurring on the output side for a rotation of the output shaft 15 to the right, the lock is triggered by the upper locking bolt 28 and, in this case, with the compression of the spring element 29 in the contact point 40 of the upper locking bolt 28 with the locking disk 17, a force occurs in the line of application D, which also cuts the sectional area 38 of the two angles of friction 34, 36, and which consequently effects a swiveling of the locking disk 17 around the swiveling axis 32 to the right to trigger an automatic clamping of the clamping bolts 19 and 20 on the locking ring walls 18. In the process, the output torque is also absorbed by the locking disk 17 and the associated housing 11 locked on the locking ring walls 18 and is not transmitted to the drive shaft 14.

Figure 3:
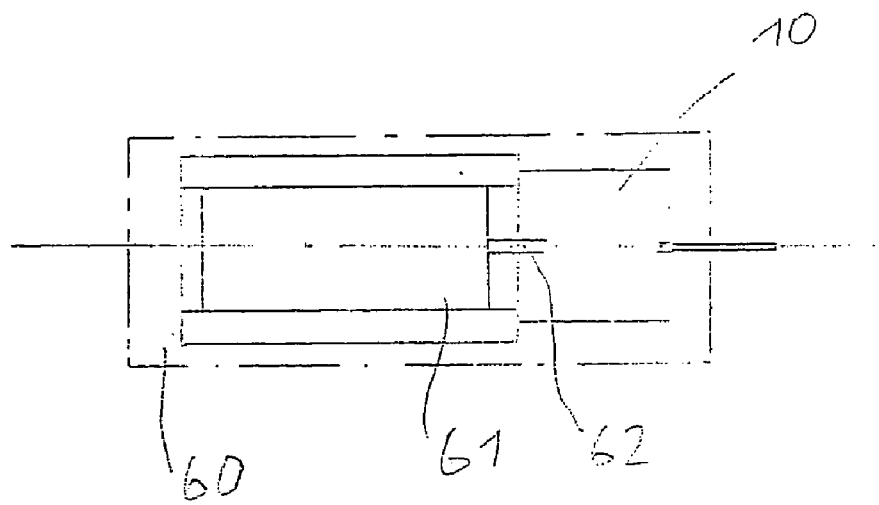
FIG. 3 shows a schematic block diagram of drive unit made up of an electric motor and a load torque lock.

FIG. 3 shows a schematic representation of the application of a load torque lock 10 in accordance with FIGS. 1 and 2 in a drive unit 60 in which it is combined with an electric motor 61 of such a type that the output shaft 62 of the electric motor 61 simultaneously forms the drive shaft of the load torque lock 10. Such an application is advantageous for example in motor vehicles for the driving mechanisms of windshield wipers, window lifters, seat adjusters, clutch adjusters and the like since it permits the possibility of precisely maintaining the achieved intermediate and end positions of the unit, something which is urgently required, e.g., in the case of adjuster driving mechanisms.

Figure 4:
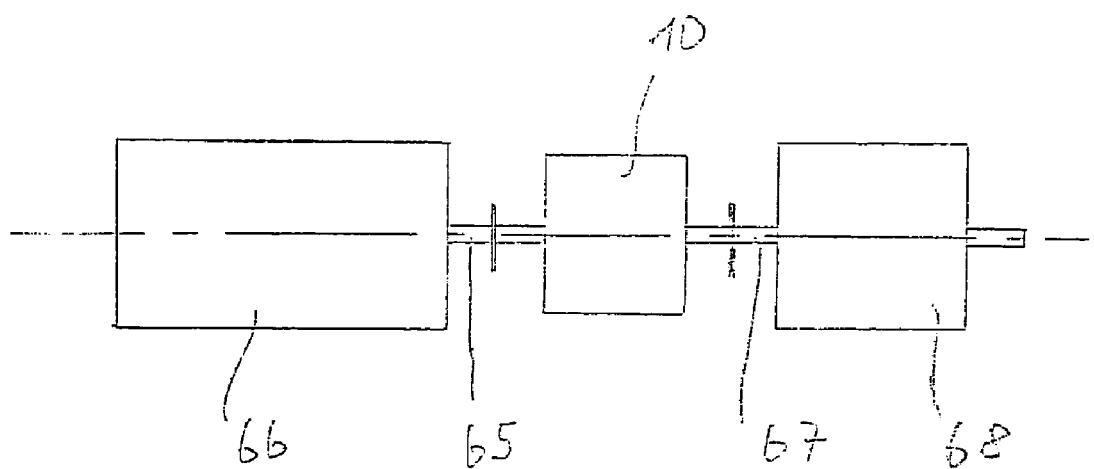
FIG. 4 shows a schematic block diagram of drive system made up of an electric motor, load torque lock and transmission unit.

FIG. 4 depicts another application of the load torque lock 10 from FIGS. 1 and 2 namely a load torque lock in a drive train with a transmission. Since, e.g., in the domain of electrical tools or, e.g., in the case of cable winches, high-speed electric motorized driving mechanisms with a self-locking transmission are required, an overall efficiency of clearly under 50% is produced due to the friction losses of these types of transmissions. According to FIG. 4, it is now planned that the load torque lock 10 be used between the output shaft 65 of an electric motor 66 and a drive shaft 67 of a transmission unit 68 without a self-locking device, whereby the overall efficiency can be improved to clearly over 50%.

What is claimed is:

1. Load torque lock (10) for automatically locking load-side torques in the case of a decrease or cessation of a drive-side torque with the maintenance of the transmission possibility of drive-side torques from a drive shaft (14) to the output shaft (15) of the load torque lock, comprised of a housing (11) fixed to a frame with at least one locking ring (18) permanently connected to the housing and with at least one locking body (17) cooperating with the locking ring and revolving with the drive shaft, which features locking means (19, 20), which, on the one hand, press against the locking ring (18) with the occurrence of a load-side torque and the cessation of a correspondingly large drive-side torque by swiveling the locking body in one rotational direction by means of a locking element (27, 28) of the output shaft (15) and which, on the other hand, releases from the locking ring with the occurrence of a drive-side torque by swiveling the locking body in the other rotational direction by means of a driving element (23, 24) of the drive shaft (14), wherein the locking body (17) is embodied in such a way that its mass center of gravity (M) lies in the area of the rotational axis (16) of the drive shaft (14) and the output shaft (15) that are aligned with one another, wherein the locking body (17) is designed as a locking disk, which is arranged perpendicular to the axis of rotation (16) in the housing (11), and wherein the locking disk (17) features at least two locking means (19, 20) on radii of different sizes and offset from one another in the circumferential direction by an angle (α), of which the one locking means (19) cooperates with the outside (21) of the locking ring (18) fixed to the housing and the other locking means (20) cooperates with the inside (22) of the locking ring.

2. Load torque lock according to claim 1, wherein the locking disk has opposite sides, and wherein the load torque lock includes a second locking ring in addition to the at least one locking ring, characterized in that on both sides of the locking disk (17) the two aligned locking means (19, 20) are each arranged laterally reversed, each of which cooperate with one of the two locking rings (18) arranged fixed to the housing on both sides of the locking disk (17).

3. Load torque lock according to claim 1, characterized in that the locking means (19, 20) are arranged in a radial external area of the locking disk (17), whereby the driving elements (23, 24) and the locking elements (27, 28) of the drive shaft (14) and the output shaft (15) engage on its radial interior area to swivel the locking disk (17).

4. Load torque lock according to claim 3, characterized in that, related to a first plane (33) stretched over the axis of rotation (16) and running though the locking means (19, 20), the at least one driving element (23, 24) on the one side of this plane (33) and the at least one locking element (27, 28) on the other side of this plane (33) engage at the locking disk (17) in such a way that they swivel the locking disk (17) to release or lock the locking means (19, 20) perpendicular to this first plane (33) in the one direction or the other opposing direction.

5. Load torque lock according to claim 4, characterized in that, in the case of a lock that acts in both directions of rotation, one driving element (23, 24) and one locking element (27, 28) for each direction of rotation each engage on the locking disk (17).

6. Load torque lock according to claim 5, characterized in that, related to a second plane (44) stretched over the axis of rotation (16) and perpendicular to the first plane, a driving element (23) and locking element (27) each engage on the one side of this second plane (44) and a driving element (24) and locking element (28) each engage on the other side of this second plane (44) at the locking disk (17).

7. Load torque lock according to claim 4, characterized in that when the locking disk (17) is in a position of rest, the at least one driving element (23, 24) forms a contact point (42, 43) with the locking disk (17) on its side facing the first plane (33).

8. Load torque lock according to claim 7, characterized in that when the locking disk (17) is in a position of rest, the at least one locking element (27, 28) features a small distance (41) to a contact point (39, 40) with the locking disk (17) on its side facing the first plane (33).

9. Load torque lock according to claim 1, characterized in that a material accumulation (45) is arranged on the circumferential area of the locking disk (17) that is diametrically opposed to the locking means (19, 20) in such a way that the mass center of gravity (M) of the locking disk (17) lies as precisely as possible on the axis of rotation (16).

10. Load torque lock according to claim 1, characterized in that the housing (11) is embodied cylindrically, whereby a ring air gap (46) sufficient for the swivel movement of the locking disk (17) to release or lock the locking means (19, 20) lies between the locking disk (17) and the inside wall (12a) of the outer housing wall (12).

11. Load torque lock according to claim 1, characterized in that the load torque lock is combined with an electric motor (61) into a drive unit (60), in which the output shaft (62) of the electric motor (61) simultaneously forms the drive shaft of the load torque lock (10).

12. Load torque lock according to claim 1, characterized in that the load torque lock is used between the output shaft (65) of an electric motor (66) and the drive shaft (67) of a non-self-locking transmission unit (68).

13. Load torque lock according to claim 1, characterized in that the locking disk is circular or annular.

14. Load torque lock (10) for automatically locking load-side torques in the case of a decrease or cessation of a drive-side torque with the maintenance of the transmission possibility of drive-side torques from a drive shaft (14) to the output shaft (15) of the load torque lock, comprised of a housing (11) fixed to a frame with at least one locking ring (18) permanently connected to the housing and with at least one locking body (17) cooperating with the locking ring and revolving with the drive shaft, which features locking means (19, 20), which, on the one hand, press against the locking ring (18) with the occurrence of a load-side torque and the cessation of a correspondingly large drive-side torque by swiveling the locking body in one rotational direction by means of a locking element (27, 28) of the output shaft (15) and which, on the other hand, releases from the locking ring with the occurrence of a drive-side torque by swiveling the locking body in the other rotational direction by means of a driving element (23, 24) of the drive shaft (14), wherein the locking body (17) is embodied in such a way that its mass center of gravity (M) lies in the area of the rotational axis (16) of the drive shaft (14) and the output shaft (15) that are aligned with one another, wherein the locking body (17) is designed as a locking disk, which is arranged perpendicular to the axis of rotation (16) in the housing (11), and wherein the locking means (19, 20) are embodied as clamping bolts projecting from a side of the locking disk (17) parallel to the axis of rotation (16).

15. Load torque lock according to claim 14, wherein the load torque lock includes a second locking ring in addition to the at least one locking ring, and wherein the housing has two front sides, characterized in that the locking rings (18) are embodied as a locking ring wall projecting inward from each front side (11a, 11b) of the housing (11) until in front of the locking disk (17) and concentric to the axis of rotation (16), the locking ring having an outside (21) and an inside (22) on which a clamping bolt (19, 20) of the locking disk (17) are each able to engage.

16. Load torque lock (10) for automatically locking load-side torques in the case of a decrease or cessation of a drive-side torque with the maintenance of the transmission possibility of drive-side torques from a drive shaft (14) to the output shaft (15) of the load torque lock, comprised of a housing (11) fixed to a frame with at least one locking ring (18) permanently connected to the housing and with at least one locking body (17) cooperating with the locking ring and revolving with the drive shaft, which features locking means (19, 20), which, on the one hand, press against the locking ring (18) with the occurrence of a load-side torque and the cessation of a correspondingly large drive-side torque by swiveling the locking body in one rotational direction by means of locking elements (27, 28) of the output shaft (15) and which, on the other hand, releases from the locking ring with the occurrence of a drive-side torque by swiveling the locking body in the other rotational direction by means of a driving element (23, 24) of the drive shaft (14), wherein the locking body (17) is embodied in such a way that its mass center of gravity (M) lies in the area of the rotational axis (16) of the drive shaft (14) and the output shaft (15) that are aligned with one another, wherein the locking body (17) is designed as a locking disk, which is arranged perpendicular to the axis of rotation (16) in the housing (11), and wherein the locking elements (27, 28) are embodied as locking bolts projecting from a flange-like end (15a) of the output shaft (15) parallel to the axis of rotation (16), each of which engages in a larger recess (30, 31) of the locking disk (17), and wherein each of the locking elements engages in the larger recess of the locking disk together with a spring element (29).

17. Load torque lock according to claim 16, characterized in that the driving element (23, 24) includes driving bolts projecting from a flange-like end (14a) of the drive shaft (14) parallel to the axis of rotation (16), each of which engages in a larger recess (25, 26) of the locking disk (17).

18. Load torque lock according to claim 17, characterized in that the flange-like ends (14a, 15a) of the drive shaft (14) and the output shaft (15) are positioned on the opposing front sides (11a, 11b) of the housing (11).

19. Load torque lock according to claim 18, characterized in that the locking disk (17) is arranged between the spaced-apart, flange-like ends (14a, 15a) of the drive shaft (14) and output shaft (15).

20. Load torque lock according to claim 19, characterized in that the locking disk (17) is provided with a centric opening (47), through which a bearing neck (48) of the output shaft (15) projects, which is accommodated in a bearing (49) inserted in a front-side bearing bore hole (50) of the drive shaft (14).

21. Load torque lock according to claim 16, characterized in that when the locking disk (17) is in a position of rest, the at least one locking element (27, 28) features a small distance (41) to a contact point (39, 40) with the locking disk (17) on its side facing a first plane (33) stretched over the axis of rotation (16) and running though the locking means (19, 20), and characterized in that the distance (41) is bridged by the spring element (29) on the locking bolts (27, 28) forming the locking element.

* * * * *